(12) United States Patent
Wang

(10) Patent No.: US 11,523,141 B2
(45) Date of Patent: Dec. 6, 2022

(54) IMAGE PROCESSING METHOD, APPARATUS, DEVICE AND STORAGE MEDIUM

(71) Applicant: BEIJING BAIDU NETCOM SCIENCE TECHNOLOGY CO., LTD., Beijing (CN)

(72) Inventor: Chengjin Wang, Beijing (CN)

(73) Assignee: BEIJING BAIDU NEICOM SCIENCE TECHNOLOGY CO., LTD., Beijing (CN)

(*) Notice: Subject to any disclaimer, the term of this patent is extended or adjusted under 35 U.S.C. 154(b) by 14 days.

(21) Appl. No.: 17/209,834

(22) Filed: Mar. 23, 2021

(65) Prior Publication Data
US 2021/0211740 A1 Jul. 8, 2021

(30) Foreign Application Priority Data
Jun. 30, 2020 (CN) .......................... 202010610256.X

(51) Int. Cl.
*H04N 7/18* (2006.01)
*H04N 19/85* (2014.01)
(Continued)

(52) U.S. Cl.
CPC .............. *H04N 19/85* (2014.11); *B60R 1/00* (2013.01); *G06T 7/0002* (2013.01);
(Continued)

(58) Field of Classification Search
CPC .......... H04N 7/18; H04N 19/85; H04N 17/00; H04N 17/002; B60R 1/00; B60R 2300/30;
(Continued)

(56) References Cited

U.S. PATENT DOCUMENTS 8,031,770 B2* 10/2011 Lee ...................... H04N 17/004
375/240.26
8,446,946 B2* 5/2013 Chiang ................ H04N 19/152
382/232
(Continued)

FOREIGN PATENT DOCUMENTS

CN 102186098 A 9/2011
CN 104123705 A 10/2014
(Continued)

OTHER PUBLICATIONS

First Office Action of the parallel application JP2021-064162.
(Continued)

*Primary Examiner* — Trang U Tran
(74) *Attorney, Agent, or Firm* — J.C. Patents

(57) ABSTRACT

The present application discloses an image processing method, apparatus, device and storage media. A specific implementation solution is: obtaining an original image and a noise-added image, where the noise-added image is an image of the original image after a noise is added, and a number of pixels with a noise in the original image is less than a preset number; encoding and decoding the original image and the noise-added image respectively, to obtain a first decoded image corresponding to the original image and a second decoded image corresponding to the noise-added image; obtaining a first PSNR between the first decoded image and the original image according to the original image and the first decoded image; obtaining a second PSNR between the second decoded image and the noise-added image according to the noise-added image and the second decoded image; and outputting the first PSNR and the second PSNR.

17 Claims, 8 Drawing Sheets

(51) Int. Cl.
  *B60R 1/00* (2022.01)
  *G06T 7/00* (2017.01)
  *H04N 17/00* (2006.01)
(52) U.S. Cl.
  CPC ........ *H04N 17/002* (2013.01); *B60R 2300/30* (2013.01); *G06T 2207/10016* (2013.01); *G06T 2207/30168* (2013.01); *G06T 2207/30252* (2013.01)
(58) Field of Classification Search
  CPC ......... G06T 7/0002; G06T 2207/10016; G06T 2207/30168; G06T 2207/30252
  USPC ........................................................ 348/148
  See application file for complete search history.

(56) References Cited

U.S. PATENT DOCUMENTS

| | | | | |
|---|---|---|---|---|
| 8,508,597 | B2* | 8/2013 | Bourret | G06T 7/001 348/192 |
| 8,947,539 | B2* | 2/2015 | Lee | H04N 17/004 348/193 |
| 9,049,420 | B1* | 6/2015 | Wang | H04N 19/154 |
| 9,269,127 | B2* | 2/2016 | Ding | G06T 5/50 |
| 9,426,478 | B2* | 8/2016 | Li | H04N 19/36 |
| 10,070,133 | B2* | 9/2018 | Kim | H04N 19/44 |
| 11,153,575 | B2* | 10/2021 | Lee | G06V 10/30 |
| 2004/0175056 | A1 | 9/2004 | Lee | |
| 2006/0268980 | A1 | 11/2006 | Le Dinh | |
| 2009/0153668 | A1* | 6/2009 | Kim | H04N 21/654 348/180 |
| 2011/0110578 | A1 | 5/2011 | Longo | |
| 2014/0015923 | A1 | 1/2014 | Au | |

FOREIGN PATENT DOCUMENTS

| | | |
|---|---|---|
| CN | 105933705 A | 9/2016 |
| CN | 107770517 A | 3/2018 |
| JP | 6275362 B1 | 2/2018 |
| JP | 2018063551 A | 4/2018 |
| KR | 20050111128 A | 11/2005 |
| KR | 1020090080830 A | 7/2009 |
| KR | 101716082 B1 | 3/2017 |
| WO | WO2017163538 A1 | 9/2017 |

OTHER PUBLICATIONS

"Lossy compression of noisy images", IEEE Transactions on Image Processing, vol. 7, No. 12, Dec. 1998, pp. 1641-1652.
Extended European Search Report of EP211643747.
NPL1: "Is there a relationship between peak-signal-to-noise ratio and structural similarity index measure?", IET Image Processing, EIT, UK, vol. 7, No. 1, Feb. 1, 2013, pp. 12-24.
NPL2: "Investigating symmetric and asymmetric stereoscopic compression using the PSNR image quality metric", Information Sciences and Systems (CISS), 2010 44th Annual Conference on, IEEE, Piscataway, NJ, USA, Mar. 17, 2010, pp. 1-6.
NPL3: "Utility of Video Reference Signals Besed on Additive Random Noise Process", Informational Telecommunication Union, Geneva; CH, vol. 22/12, Dec. 1, 2014, pp. 1-5.
The Notification of Reason for Refusal of KR Application No. 10-2021-0038690.
The First Office Action of CN Application No. 202010610256X.
NPL: "Comparison and analysis of H.264 and HEVC video coding standards based on PSNR evaluation meth", China Computer & Communication, vol. 16, 2016, pp. 86-91.

* cited by examiner

IMAGE PROCESSING METHOD, APPARATUS, DEVICE AND STORAGE MEDIUM

CROSS-REFERENCE TO RELATED APPLICATION

This application claims priority to Chinese Patent Application No. 202010610256.X filed on Jun. 30, 2020, which is hereby incorporated by reference in its entirety.

TECHNICAL FIELD

Embodiments of the present application relates to the field of image processing, and in particular to an image processing method, apparatus, device and storage medium, which may be used in the field of automatic driving.

BACKGROUND

In an automatic driving system, an original video collected by a camera needs to be compressed and encoded before placing order. A difference between an original image in the original video and a decoded image obtained after the original image is compressed and encoded and then decoded may be represented by a peak signal to noise ratio (referred as PSNR for short). The lower a value of the PSNR between the original image and its corresponding decoded image, the larger the difference between the original image and its corresponding decoded image.

At present, it is detected that the value of the PSNR between some original images in the original video and their corresponding decoded images is a lower value that is less than a first preset threshold, which means that the difference between the decoded images obtained after some original images are encoded and decoded and these original images is large, that is, a quality of the decoded image is poor. The quality of the decoded image directly affects a normal operation of the automatic driving, therefore, it is particularly important to obtain a reason for the PSNR between the original image and its corresponding decoded image being low.

SUMMARY

The present application provides an image processing method, apparatus, device and storage medium.

According to an aspect of the present application, an image processing method is provided, the method includes: obtaining an original image and a noise-added image, where the noise-added image is an image of the original image after a noise is added, and a number of pixels with a noise in the original image is less than a preset number; encoding and decoding the original image and the noise-added image respectively, to obtain a first decoded image corresponding to the original image and a second decoded image corresponding to the noise-added image; obtaining a first peak signal to noise ratio PSNR between the first decoded image and the original image according to the original image and the first decoded image; obtaining a second PSNR between the second decoded image and the noise-added image according to the noise-added image and the second decoded image; and outputting the first PSNR and the second PSNR.

It should be understood that the content described in the section is neither intended to identify key or important features of the embodiments of the present application, nor intended to limit the scope of the present application. Other features of the present application will become easy to understand through the following description.

BRIEF DESCRIPTION OF THE DRAWINGS

The drawings are used to better understand the solution, and do not constitute a limitation to the present application. Where.

DETAILED DESCRIPTION OF THE EMBODIMENTS

Figure 1:
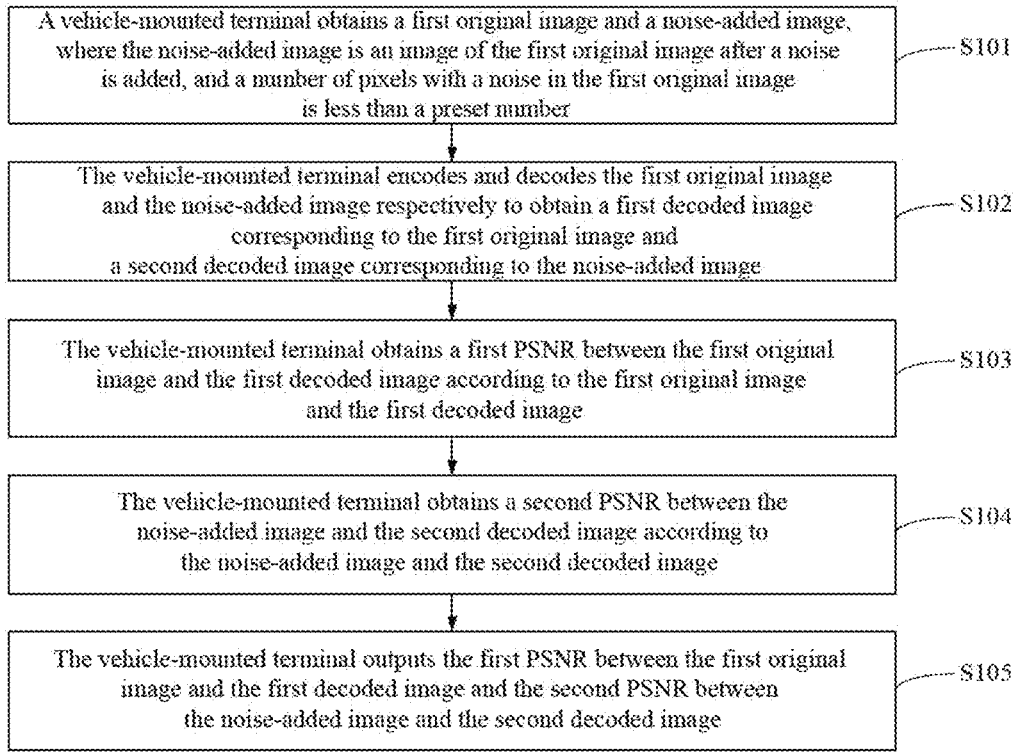
FIG. 1 is a first flowchart of an image processing method according to an embodiment of the present application.

The following describes exemplary embodiments of the present application with reference to the accompanying drawings, which include various details of the embodiments of the present application to facilitate understanding, and should be considered as merely exemplary. Therefore, those of ordinary skilled in the art should realize that various changes and modifications may be made to the embodiments described herein without departing from the scope and spirit of the present application. Similarly, for clarity and conciseness, descriptions of well-known functions and structures are omitted in the following description.

The present application provides an image processing method, apparatus, device and storage medium, which are applied to the field of automatic driving in the image processing field, so as to obtain a credible reason for a PSNR between an image and a corresponding decoded image after encoding and decoding being low, thereby ensuring a purpose of a normal operation of an automatic driving.

In an automatic driving system, a video collected by a camera needs to be compressed and encoded before placing order. A difference between an original image in the original video and a decoded image obtained after the original image is compressed and encoded and then decoded may be represented by a peak signal to noise ratio (referred as PSNR for short). The lower a value of the PSNR between the original image and its corresponding decoded image, the larger the difference between the original image and its corresponding decoded image.

At present, it is detected that the value of the PSNR between some original images in the original video and their corresponding decoded images after encoding and decoding is a lower value that is less than a first preset threshold, which means that the obtained decoded image of this part of the original image after encoding and decoding surfers seriously damage, and a quality of the decoded image directly affects whether the automatic driving may operate normally, therefore it is particularly important to obtain the reason for the PSNR between some original images and their corresponding decoded images being low. However, the currently given reasons for the PSNRs between some images and their corresponding decoded images being low are all speculations without theoretical basis. For example, all images whose corresponding PSNRs are less than the first preset threshold are obtained, a common ground is observed, and after detailed inspection, it is found that the images whose corresponding PSNRs are less than the first preset threshold have a problem of a large noise in the original image. Therefore, it is speculated that the reason for the PSNRs between some images and their corresponding decoded images being low is that: there is a problem with the encoding and decoding algorithm, so that when the image noise is large, a difference between a decoded image corresponding to an image and the image is large, that is, the PSNR between the image and its corresponding decoded image is low. But this reason is only speculation without theoretical basis. Therefore, how to obtain the credible reason for the PSNRs between some images and their corresponding decoded images being low is a technical problem to be solved urgently.

In order to solve the above technical problems, the present application proposes an image processing method, which, by obtaining a PSNR between an original image without an obvious noise and its corresponding decoded image, and obtaining a PSNR between a noise-added image of the original image after a noise is added and its corresponding decoded image, can determine a credible reason for the PSNRs between some images and their corresponding decoded images being low according to the two PSNRs. Specific embodiments are used to describe the image processing method of the present application in the following.

FIG. 1 is a first flowchart of an image processing method according to an embodiment of the present application. The method of the embodiment is applied to a vehicle-mounted terminal with an automatic driving system being run. Referring to FIG. 1, the method of the embodiment includes:

Step S101, a vehicle-mounted terminal obtains a first original image and a noise-added image, where the noise-added image is an image of the first original image after a noise is added, and a number of pixels with a noise in the first original image is less than a preset number.

That is, the first original image in this step is an image without an obvious noise.

A format of the first original image and the noise-added image may be a Luma and Chroma (YUV) format.

Step S102, the vehicle-mounted terminal encodes and decodes the first original image and the noise-added image respectively to obtain a first decoded image corresponding to the first original image and a second decoded image corresponding to the noise-added image.

In this embodiment, the encoding and decoding of an image refers to compressing and encoding the image and then decompressing the image, and decompressing is also decoding. For example, the first decoded image corresponding to the first original image refers to an image obtained after the first original image is compressed and encoded and then decoded; the second decoded image corresponding to the noise-added image refers to an image obtained after the noise-added image is compressed and encoded and then decoded.

The encoding and decoding method for the image in the embodiment may be a current general method, such as a video encoding and decoding method based on an H265 protocol.

Step S103: the vehicle-mounted terminal obtains a first PSNR between the first original image and the first decoded image according to the first original image and the first decoded image.

The method of obtaining the PSNR between the first original image and the first decoded image is a current general method, and will not be repeated here.

Step S104: the vehicle-mounted terminal obtains a second PSNR between the noise-added image and the second decoded image according to the noise-added image and the second decoded image.

The method of obtaining the PSNR between the noise-added image and the second decoded image is a current general method, and will not be repeated here.

Step S105: the vehicle-mounted terminal outputs the first PSNR between the first original image and the first decoded image and the second PSNR between the noise-added image and the second decoded image.

In a mode, the vehicle-mounted terminal may output the first PSNR and the second PSNR to a display screen of the vehicle-mounted terminal, so that the display screen of the vehicle-mounted terminal displays the first PSNR and the second PSNR.

In another mode, the vehicle-mounted terminal may output the first PSNR and the second PSNR to other devices with a display screen, so that other devices may display the first PSNR and the second PSNR. Other devices may be terminal devices or servers.

In the embodiment, the first PSNR between the first original image and the first decoded image corresponding to the first original image and the second PSNR between the noise-added image and the second decoded image corresponding to the noise-added image are obtained. Since the first original image is an image with little noise, whether the encoding and decoding algorithm is the reason that causes the PSNRs between some images and their corresponding decoded images to be low may be determined according to the first PSNR without an interference of noise. If it is determined that the encoding and decoding algorithm is not the reason that causes the PSNRs between some images and their corresponding decoded images to be low, the reason that causes the PSNRs between some images and their corresponding decoded images to be low may be determined according to a value of the second PSNR. For example, when the value of the second PSNR is low, it may be determined that the vehicle-mounted terminal performs noise reduction processing before compressing and encoding the noise-added image. That is, the method of the embodiment obtains two objective experimental data of the first PSNR and the second PSNR, and the reliable reason for the PSNR between the image and the corresponding decoded image being low may be obtained by analyzing the two objective experimental data to ensure the normal operation of autonomous driving.

The process of determining the credible reason for the PSNRs between some images and their corresponding decoded images being low through several specific examples of the first PSNR and the second PSNR will be described in the following.

In a specific example, as shown in Table 1.1, the first original image is Image 1, the first PSNR between the first original image and its corresponding first decoded image is 40.582. The second PSNR between the noise-added Image 11 of the first original image after a salt noise is added and its corresponding second decoded image is 17.609. Alternatively, as shown in Table 1.2, the first original image is Image 2, the first PSNR between the first original image and the first decoded image corresponding to the first original image is 38.337, the second PSNR between the noise-added image 21 of the first original image after a salt noise is added and the second decoded image corresponding to the noise-added Image 21 is 18.261.

TABLE 1.1

| Image(s) name | Frame number | Whether to add noise | PSNR |
| --- | --- | --- | --- |
| Image 1 | 1 | No | 40.582 |
| Image11 | 1 | Add a salt noise | 17.609 |

TABLE 1.2

| Image(s) name | Frame number | Whether to add noise | PSNR |
| --- | --- | --- | --- |
| Image 2 | 1 | No | 38.337 |
| Image 21 | 1 | Add a salt noise | 18.261 |

In another specific example, as shown in Table 2.1, the first original image is Image 1, and the first PSNR between the first original image and the first decoded image corresponding to the first original image is 40.582. The second PSNR between the noise-added Image 12 of the first image after a pepper noise is added and the second decoded image corresponding to the noise-added Image 12 is 29.064. Alternatively, as shown in Table 2.2, the first original image is Image 2, the first PSNR between the first original image and the first decoded image corresponding to the first original image is 38.337, and the second PSNR between the noise-added Image 22 of the first original image after a pepper noise is added and the second decoded image corresponding to the noise-added Image 22 is 26.632.

TABLE 2.1

| Image(s) name | Frame number | Whether to add noise | PSNR |
| --- | --- | --- | --- |
| Image 1 | 1 | No | 40.582 |
| Image 12 | 1 | Add a pepper noise | 29.064 |

TABLE 2.2

| Image(s) name | Frame number | Whether to add noise | PSNR |
| --- | --- | --- | --- |
| Image 2 | 1 | No | 38.337 |
| Image 22 | 1 | Add a pepper noise | 26.632 |

In yet another specific example, as shown in Table 3.1, the first original image is Image 1, and the first PSNR between the first original image and the first decoded image corresponding to the first original image is 40.582. The second PSNR between the noise-added Image 13 of the first original image after a Gaussian noise is added and the second decoded image corresponding to the noise-added Image 13 is 20.628. Alternatively, as shown in Table 3.2, the first original image is Image 2, and the first PSNR between the first original image and the first decoded image corresponding to the first original image is 38.337, and the second PSNR between the noise-added Image 23 of the first original image after a Gaussian noise is added and the second decoded image corresponding to the noise-added Image 23 is 20.094.

TABLE 3.1

| Image(s) name | Frame number | Whether to add noise | PSNR |
| --- | --- | --- | --- |
| Image 1 | 1 | No | 40.582 |
| Image 13 | 1 | Add a Gaussian noise | 20.628 |

TABLE 3.2

| Image(s) name | Frame number | Whether to add noise | PSNR |
| --- | --- | --- | --- |
| Image 2 | 1 | No | 38.337 |
| Image 23 | 1 | Add a Gaussian noise | 20.094 |

When A second preset threshold is 35, it may be seen from the above examples that each first PSNR between the first original image and the first decoded image corresponding to the first original image is high and is greater than the second preset threshold value, which means that the difference between the first original image and its corresponding first decoded image is small, that is, the encoding and decoding algorithm makes an loss of original information of the first original image be small during a compression and decompression process of the first original image, then there is no problem with the encoding and decoding algorithm. It is not the reason for the second PSNR being low, that is, it is not the reason for the PSNRs between some images and the corresponding decoded images being low, either.

While the second PSNR is significantly lower than the first PSNR, and there is no problem with the encoding and decoding algorithm, the difference between the noise-added image and its corresponding second decoded image is not large in theoretically. However, it can be seen from the second PSNR being obvious lower than the first PSNR, the difference between the noise-added image and its corresponding second decoded image is large, so it may be determined that the vehicle-mounted terminal performs noise reduction processing before compressing and encoding the noise-added image. This is because the larger the difference between the noise-added image after noise reduction processing and the noise-added image, the larger the difference between the second decoded image obtained by encoding and decoding the noise-added image after noise reduction processing and the noise-added image, which results in that the second PSNR between the noise-added image and the second decoded image is low. That is, the reason for the second PSNR being low is that the vehicle-mounted terminal performs noise reduction processing before compressing and encoding the noise-added image. In other words, the reason for the PSNRs between some images and the corresponding decoded images being low is that the vehicle-mounted terminal performs noise reduction processing before compressing and encoding the image. This reason also supports that the first PSNR is higher than the second preset threshold. The analysis is as follows: the noise of the first original image is small, and the vehicle-mounted terminal performs noise reduction processing before compressing and encoding the first original image, and the difference between the first original image after noise reduction processing and the first original image is very small, when there is no problem with the encoding and decoding algorithm, the difference between the first decoded image obtained by encoding and decoding the first original image after noise reduction processing and the first original image is small too, which causes the first PSNR to be high. Therefore, the vehicle-mounted terminal performing noise reduction processing before compressing and encoding the image is a credible reason that causes the PSNRs between some images and the corresponding decoded images to be low.

Figure 2:
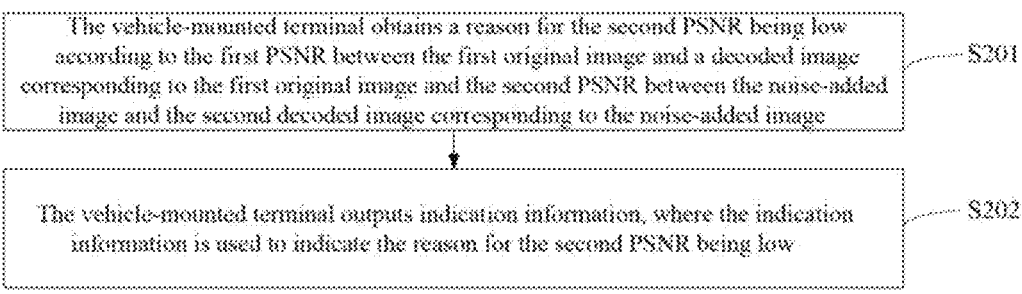
FIG. 2 is a second flowchart of an image processing method according to an embodiment of the present application.

In order to improve an efficiency of obtaining the credible reason for the PSNRs between some images and the corresponding decoded images being low, an embodiment is improved on the basis of the previous embodiment. FIG. 2 is a second flowchart of an image processing method according to an embodiment of the present application. Referring to FIG. 2, the embodiment further includes the following steps on the basis of the previous embodiment:

Step S201, The vehicle-mounted terminal obtains a reason for the second PSNR being low according to the first PSNR between the first original image and a decoded image corresponding to the first original image and the second PSNR between the noise-added image and the second decoded image corresponding to the noise-added image.

In a specific implementation, the vehicle-mounted terminal obtains the reason for the second PSNR being low according to a preset analysis rule, the first PSNR and the second PSNR. The analysis rule may include that: (1) if the first PSNR is greater than the second preset threshold and the second PSNR is lower than the first PSNR, and it is determined that the encoding and decoding algorithm is not the reason that causes the second PSNR to be low, the reason for the second PSNR being low is that the vehicle-mounted terminal performs noise reduction processing before compressing and encoding the image; and (2) if the first PSNR is high and is less than the second preset threshold, then it is determined that the encoding and decoding algorithm being not applicable is a reason that causes the second PSNR to be low. The preset analysis rule is obtained based on a correct theory.

Step S202: The vehicle-mounted terminal outputs indication information, where the indication information is used to indicate the reason for the second PSNR being low.

In a mode, the vehicle-mounted terminal may output the indication information to a display screen of the vehicle-mounted terminal, so that the display screen of the vehicle-mounted terminal displays the indication information.

In another mode, the vehicle-mounted terminal may output the indication information to other devices with a display screen, so that other devices may display the indication information. Other devices may be terminal devices or servers.

In the embodiment, the vehicle-mounted terminal obtains the credible reason for the PSNRs between some images and the corresponding decoded images being low without human analysis, and improves the efficiency of obtaining the credible reason for the PSNRs between some images and the corresponding decoded images being low.

Specific embodiments are used to describe the embodiment shown in FIG. 1 or FIG. 2 in detail in the following.

First, a specific embodiment is used to describe "the vehicle-mounted terminal obtains the first original image and the noise-added image".

"The vehicle-mounted terminal obtains the first original image and the noise-added image" includes, but not limited to, the following modes:

A first mode: the vehicle-mounted terminal obtains the first original image and the noise-added image, includes: receives the first original image from other devices, and performs noise addition processing on the first original image to generate the noise-added image, which may be servers or terminal devices. The first original image may be an image taken by any photographing device.

Figure 3A:
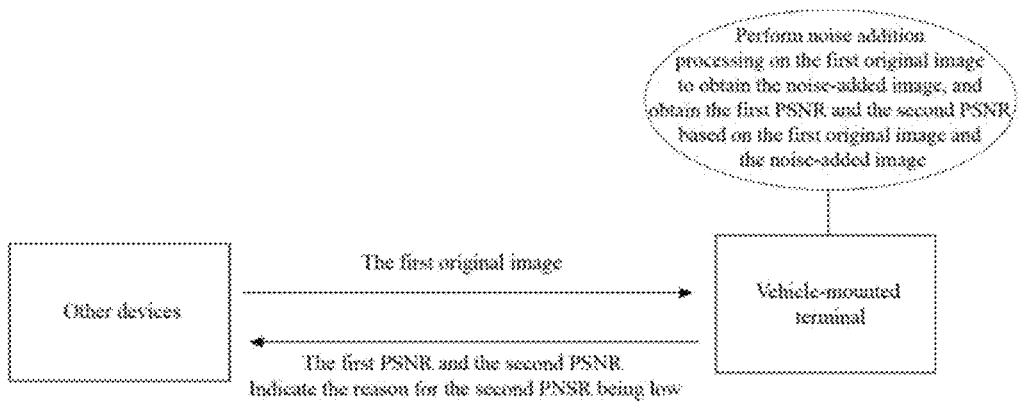
FIG. 3A is a first system architecture diagram according to an embodiment of the present application.

When the vehicle-mounted terminal outputs the first PSNR and the second PSNR to other devices, a system architecture diagram corresponding to this mode may be shown in FIG. 3A. Referring to FIG. 3A, other devices send the first original image to the vehicle-mounted terminal with the automatic driving system being run. The vehicle-mounted terminal receives the first original image and adds a noise to the first original image to obtain the noise-added image; the vehicle-mounted terminal obtains the first PSNR and the second PSNR based on the first original image and the noise-added image, and outputs the first PSNR and the second PSNR to other devices. Optionally, the vehicle-mounted terminal may also output the indication information in the embodiment shown in FIG. 2 to other devices.

Figure 3B:
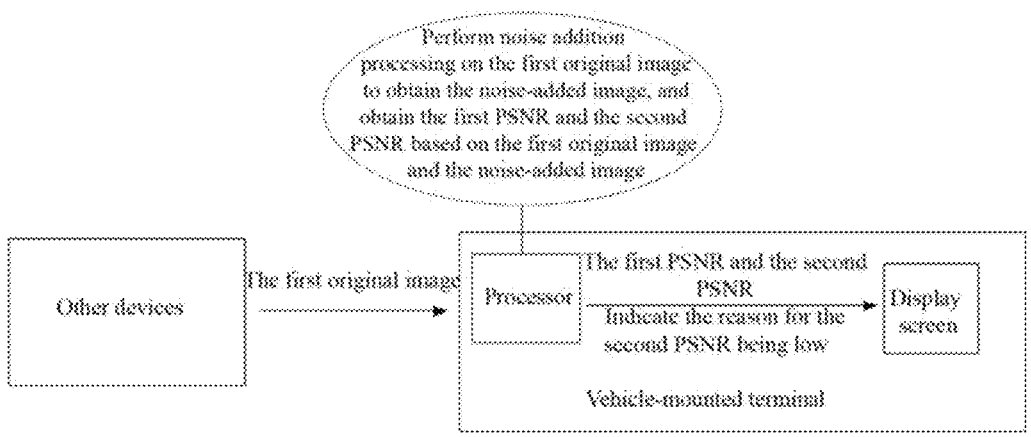
FIG. 3B is a second system architecture diagram according to an embodiment of the present application.

When the vehicle-mounted terminal outputs the first PSNR and the second PSNR to the display screen of the vehicle-mounted terminal, a system architecture diagram corresponding to this mode may be shown in FIG. 3B. Referring to FIG. 3B, other devices send the first original image to the vehicle-mounted terminal with the automatic driving system being run. The vehicle-mounted terminal receives the first original image and adds a noise to the first original image to obtain the noise-added image; the vehicle-mounted terminal obtains the first PSNR and the second PSNR based on the first original image and the noise-added image, and outputs the first PSNR and the second PSNR to the display screen of the vehicle-mounted terminal. Optionally, the vehicle-mounted terminal may also output the indication information in the embodiment shown in FIG. 2 to the display screen of the vehicle-mounted terminal.

This mode may save a signaling overhead between other devices and the vehicle-mounted terminal.

A second mode: the vehicle-mounted terminal obtains the first original image and the noise-added image, includes: the vehicle-mounted terminal receives the first original image and the noise-added image from other devices, which may be servers or terminal devices. The first original image may be an image taken by any photographing device.

Figure 4A:
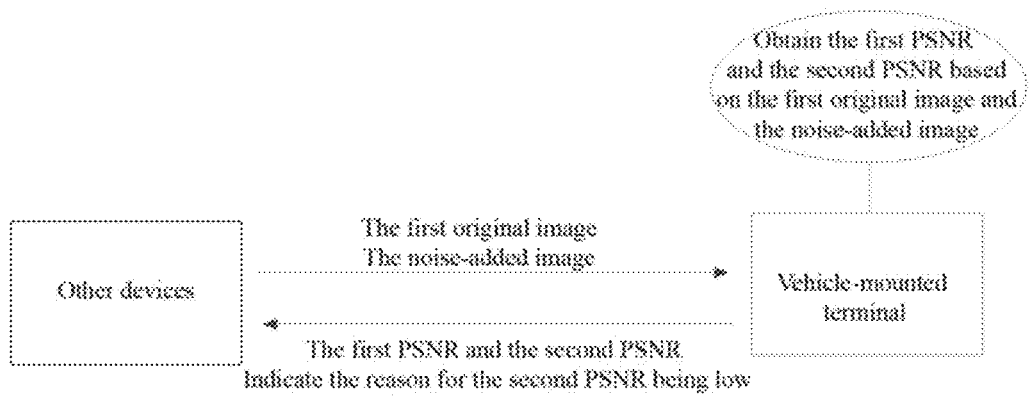
FIG. 4A is a third system architecture diagram according to an embodiment of the present application.

When the vehicle-mounted terminal outputs the first PSNR and the second PSNR to other devices, a system architecture diagram corresponding to this mode may be shown in FIG. 4A. Referring to FIG. 4A, other devices, after adding a noise to the first original image to obtain the noise-added image, send the first original image and the noise-added image to the vehicle-mounted terminal with the automatic driving system being run; the vehicle-mounted terminal obtains the first PSNR and the second PSNR based on the first original image and the noise-added image, and outputs the first PSNR and the second PSNR to other devices. Optionally, the vehicle-mounted terminal may also output the indication information in the embodiment shown in FIG. 2 to other devices. It may be understood that the method of other devices adding a noise to the first original image to obtain the noise-added image may be the same as the method of the vehicle-mounted terminal adding a noise to the first original image to obtain the noise-added image.

Figure 4B:
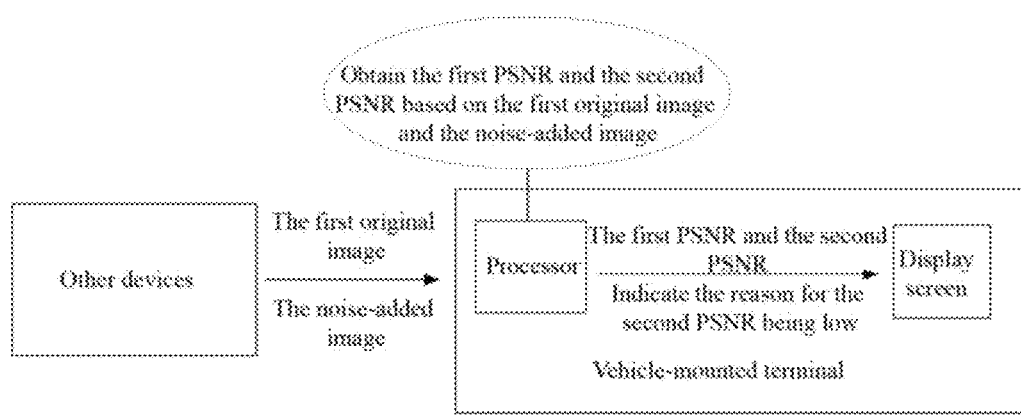
FIG. 4B is a fourth system architecture diagram according to an embodiment of the present application.

When the vehicle-mounted terminal outputs the first PSNR and the second PSNR to the display screen of the vehicle-mounted terminal, a system architecture diagram corresponding to this mode may be shown in FIG. 4B. Referring to FIG. 4B, other devices, after adding a noise to the first original image to obtain the noise-added image, send the first original image and the noise-added image to the vehicle-mounted terminal with the automatic driving system being run; the vehicle-mounted terminal obtains the first PSNR and the second PSNR based on the first original image and the noise-added image, and outputs the first PSNR and the second PSNR to the display screen of the vehicle-mounted terminal. Optionally, the vehicle-mounted terminal may also output the indication information in the embodiment shown in FIG. 2 to the display screen of the vehicle-mounted terminal.

This mode may reduce a power consumption of vehicle-mounted terminal with the autonomous driving system being run.

A third mode: the vehicle-mounted terminal obtains the first original image and the noise-added image, includes: the vehicle-mounted terminal receives the first original image from a first camera, the first camera is a camera set on the vehicle where the vehicle-mounted terminal is located; the vehicle-mounted terminal adds a noise to the first original image to obtain the noise-added image. That is to say, the first original image being an image taken by the camera set on the vehicle where the vehicle-mounted terminal is located, and specifically may be a frame image in a video collected by the camera set on the vehicle when the vehicle drives automatically.

Figure 5A:
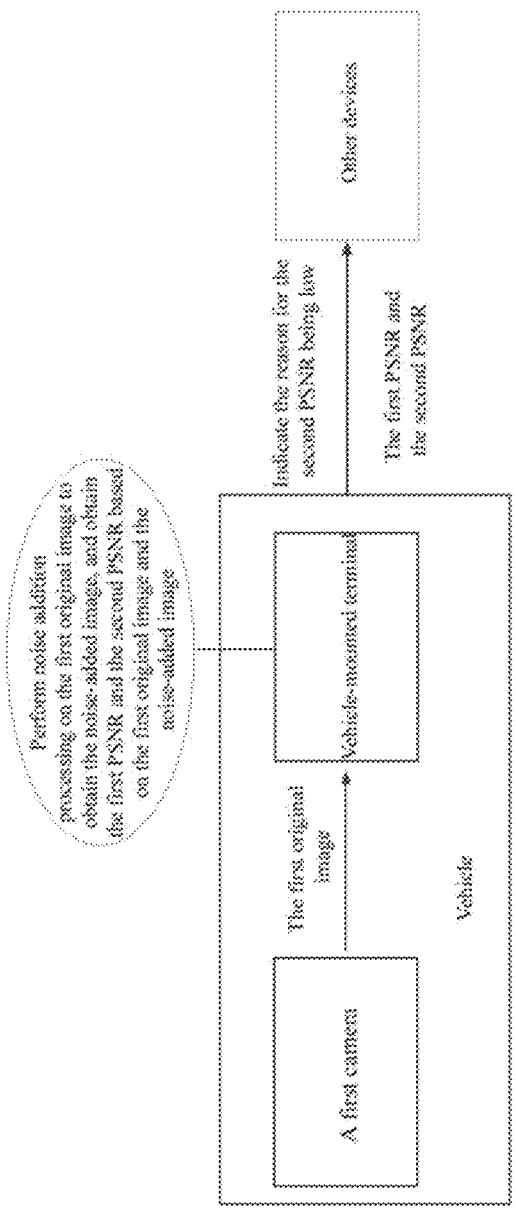
FIG. 5A is a fifth system architecture diagram according to an embodiment of the present application.

When the vehicle-mounted terminal outputs the first PSNR and the second PSNR to other devices, a system architecture diagram corresponding to this mode may be shown in FIG. 5A. Referring to FIG. 5A, the first camera set on the vehicle where the vehicle-mounted terminal with the automatic driving system being run is located, after taking the first original image, sends the first original image to the vehicle-mounted terminal, and the vehicle-mounted terminal obtains the first original image, and adds a noise to the first original image to obtain the noise-added image; the vehicle-mounted terminal obtains the first PSNR and the second PSNR based on the first original image and the noise-added image, and outputs the first PSNR and the second PSNR to other devices. Optionally, the vehicle-mounted terminal may also output the indication information in the embodiment shown in FIG. 2 to other devices.

Figure 5B:
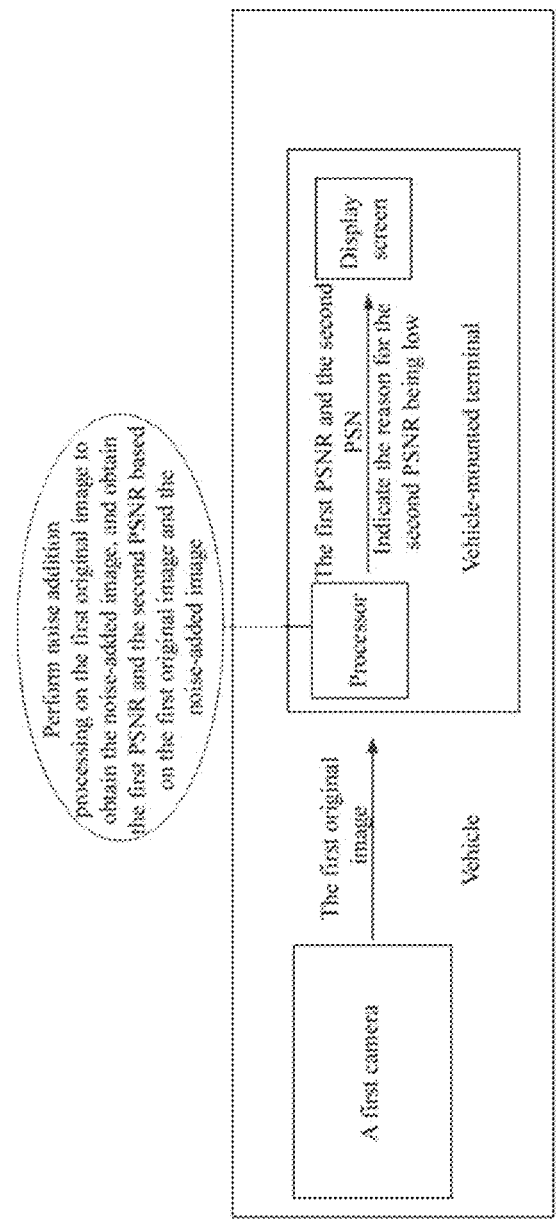
FIG. 5B is a sixth system architecture diagram according to an embodiment of the present application.

When the vehicle-mounted terminal outputs the first PSNR and the second PSNR to the display screen of the vehicle-mounted terminal, a system architecture diagram corresponding to this mode may be shown in FIG. 5B. Referring to FIG. 5B, the first camera set on the vehicle where the vehicle-mounted terminal with the automatic driving system being run is located, after taking the first original image, sends the first original image to the vehicle-mounted terminal, and the vehicle-mounted terminal obtains the first original image, and adds a noise to the first original image to obtain the noise-added image; the vehicle-mounted terminal obtains the first PSNR and the second PSNR based on the first original image and the noise-added image, and outputs the first PSNR and the second PSNR to the display screen of the vehicle-mounted terminal. Optionally, the vehicle-mounted terminal may also output the indication information in the embodiment shown in FIG. 2 to the display screen of the vehicle-mounted terminal.

This mode may save the signaling overhead between other devices and the vehicle-mounted terminal, and may also improve the efficiency of obtaining the first original image and the noise-added image.

The embodiment provides several specific implementations of obtaining the first original image and the noise-added image by the vehicle-mounted terminal.

Secondly, a specific embodiment is used to describe the specific implementation of "the vehicle-mounted terminal performs noise addition processing on the first original image to generate the noise-added image".

If an image is regarded as a signal, then a noise is an interference signal. That is, the image may be regarded as a function, and a function of the noise-added image may be regarded as a sum of a function of the original image and a noise function. The noise added is different, the corresponding noise function is also different.

Specifically, the specific implementation of "the vehicle-mounted terminal performs noise addition processing on the first original image to generate the noise-added image" includes, but is not limited to, the following modes:

A first mode: the vehicle-mounted terminal performs noise addition processing on the first original image to generate the noise-added image, includes: adds a salt noise to the first original image to obtain the noise-added image.

The adding a salt noise to the first original image may include: randomly selecting at least one pixel of the first original image to add the salt noise, that is, randomly changing the at least one pixel of the first original image to a white spot with an intensity value of 255.

Figure 6A:
FIG. 6A is a schematic diagram of a first original image according to an embodiment of the present application.
Figure 6B:
FIG. 6B is a schematic diagram of a noise-added image of a first original image after a salt noise is added according to an embodiment of the present application.

Illustratively, FIG. 6A is a schematic diagram of a first original image according to an embodiment of the present application, and FIG. 6B is a schematic diagram of a noise-added image of a first original image after a salt noise is added according to an embodiment of the present application.

A second mode: the vehicle-mounted terminal performs noise addition processing on the first original image to generate the noise-added image, includes: adds a pepper noise to the first original image to obtain the noise-added image.

The adding a pepper noise to the first original image may include: randomly selecting at least one pixel of the first original image to add the pepper noise, that is, randomly changing the at least one pixel of the first original image to a black spot with an intensity value of 0.

Figure 7:
FIG. 7 is a schematic diagram of a noise-added image of a first original image after a pepper noise is added according to an embodiment of the present application.

Illustratively, FIG. 7 is a schematic diagram of a noise-added image of a first original image after a pepper noise is added according to an embodiment of the present application.

A third mode: the vehicle-mounted terminal performs noise addition processing on the first original image to generate the noise-added image, includes: adds a salt and pepper noise to the first original image to obtain the noise-added image.

The adding a salt and pepper noise to the first original image may include: randomly selecting at least one pixel of the first original image and changing it to a black spot with an intensity value of 0, and randomly selecting at least one pixel of the first original image and changing it to a white spot with an intensity value of 255.

A fourth mode: the vehicle-mounted terminal performs noise addition processing on the first original image to generate the noise-added image, includes: the vehicle-mounted terminal adds a Gaussian noise to the first original image to obtain the noise-added image. Specifically, the vehicle-mounted terminal adds a Gaussian noise to each pixel of the original image to obtain the noise-added image.

Figure 8:
FIG. 8 is a schematic diagram of a noise-added image of a first original image after a Gaussian noise is added according to an embodiment of the present application.

Illustratively, FIG. 8 is a schematic diagram of a noise-added image of a first original image after a Gaussian noise is added according to an embodiment of the present application.

It may be understood that the above noise adding method is only an example, and other noise adding methods may also be used to obtain the noise-added image, which is not limited in the embodiment.

The embodiment gives several specific implementations of "the vehicle-mounted terminal performs noise addition processing on the first original image to generate the noise-added image".

The image processing method of the present application has been described above, and an image processing apparatus related to the present application will be described below.

Figure 9:
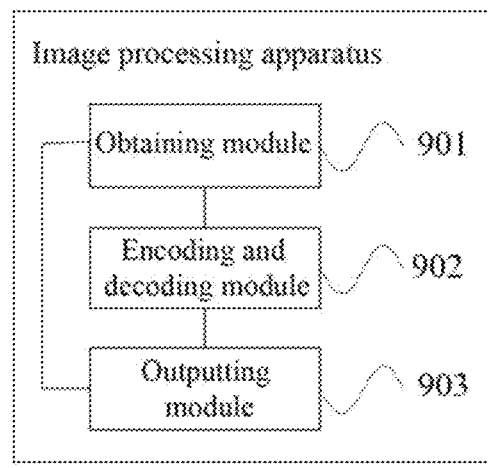
FIG. 9 is a structural diagram of an image processing apparatus according to an embodiment of the present application.

FIG. 9 is a structural diagram of an image processing apparatus according to an embodiment of the present application, where the apparatus is applied to a vehicle-mounted terminal on a vehicle with an automatic driving system being run. Referring to FIG. 9, the apparatus of the embodiment includes: an obtaining module 901, an encoding and decoding module 902, and an outputting module 903.

The obtaining module 901 is configured to obtain an original image and a noise-added image, where the noise-added image is an image of the original image after a noise is added, and a number of pixels with a noise in the original image is less than a preset number;

the encoding and decoding module 902 is configured to encode and decode the original image and the noise-added image respectively, to obtain a first decoded image corresponding to the original image and a second decoded image corresponding to the noise-added image;

the obtaining module 901 is further configured to obtain a first peak signal to noise ratio PSNR between the first decoded image and the original image according to the original image and the first decoded image; and obtain a second PSNR between the second decoded image and the noise-added image according to the noise-added image and the second decoded image;

the outputting module 903 is configured to output the first PSNR and the second PSNR.

Optionally, the obtaining module 901 is specifically configured to: receive the original image and the noise-added image.

Optionally, the obtaining module 901 is specifically configured to: receive the original image, and perform noise addition processing on the original image to generate the noise-added image.

Optionally, the obtaining module 901 is specifically configured to: randomly select at least one pixel of the original image to add a salt noise or a pepper noise to obtain the noise-added image.

Optionally, the obtaining module 901 is specifically configured to: randomly select at least one first pixel of the original image to add a salt noise, and randomly select at least one second pixel of the original image to add a pepper noise to obtain the noise-added image.

Optionally, the obtaining module 901 is specifically configured to: add a Gaussian noise to each pixel of the original image to obtain the noise-added image.

Optionally, the first PSNR is greater than a preset threshold, and the first PSNR is greater than the second PSNR; the obtaining module 901 is further configured to: obtain a reason for the second PSNR being low according to the first PSNR and the second PSNR; the outputting module 903 is further configured to: output an indication information, wherein, the indication information is used to indicate the reason for the second PSNR being low.

Optionally, the original image is a frame image in a video collected by a camera of the vehicle when the vehicle drives automatically.

Optionally, a format of the original image is a YUV forma.

The apparatus of the embodiment may be used to implement the technical solution of the above method embodiment, its implementation principle and technical effect are similar, and will not repeated here.

The present application also provides an electronic device and a readable storage medium according to an embodiment of the present application.

Figure 10:
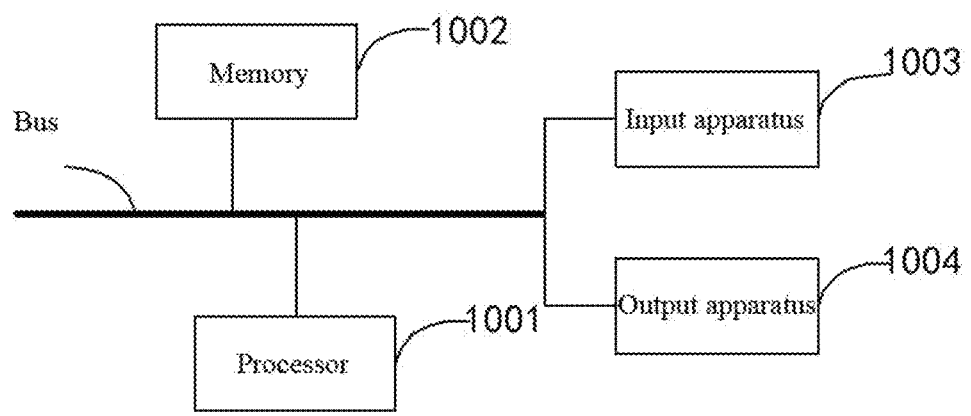
FIG. 10 is a block diagram of an electronic device used to implement an image processing method of an embodiment of the present application.

As shown in FIG. 10, it is a block diagram of an electronic device of an image processing method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile apparatuses, such as personal digital assistants, cellular phones, smart phones, wearable devices, and other similar computing apparatuses. The components shown herein, their connections and relationships, and their functions are merely examples, and are not intended to limit the implementations of the present application described and/or claimed herein.

As shown in FIG. 10, the electronic device includes: one or more processors 1001, a memory 1002, and an interface configured to connect various components and including a high-speed interface and a low-speed interface. The various components are connected to each other by using different buses, and may be installed on a common motherboard or installed in other ways as required. The processor may process instructions executed in the electronic device, including instructions stored in or on the memory to display Graphical User Interface (GUI) graphical information on an external input/output device (such as a display device coupled to an interface). In other embodiments, multiple processors may be used together and/or multiple buses may be used with multiple memories if necessary. Similarly, multiple electronic devices may be connected, and each device provides a part of necessary operations (for example, as a server array, a group of blade servers, or a multi-processor system). FIG. 10 takes a processor 1001 as an example.

The memory 1002 is a non-transitory computer-readable storage medium according to the present application. The memory stores an instruction that is executable by at least one processor to enable the at least one processor to execute the image processing method according to the present application. The non-transitory computer-readable storage medium of the present application stores a computer instruction used to cause a computer to execute the image processing method according to the present application.

The memory 1002, which acts as anon-transitory computer-readable storage medium, may be used to store a non-transitory software program, a non-transitory computer executable program and module, such as a program instruction/module corresponding to the image processing method in an embodiment of the present application (for example, the obtaining module 901, the encoding and decoding module 902 and the outputting module 903 shown in FIG. 9).

The processor 1001, by running the non-transitory software program, instruction and module stored in the memory 1002, executes various function applications and data processing of the server, that is, implements the image processing method in the above method embodiment.

The memory 1002 may include a program storage area and a data storage area, where the program storage area may store an application program required by an operating system and at least one function; the data storage area may store data created based on a use of an electronic device for image processing. In addition, the memory 1002 may include a high-speed random access memory, and may also include a non-transitory memory, such as at least one magnetic disk storage device, a flash memory device, or other non-transitory solid-state storage devices. In some embodiments, the memory 1002 may optionally include memories remotely provided with respect to the processor 1001, and these remote memories may be connected to an electronic device for image processing through a network. Examples of the aforementioned network include, but are not limited to, an internet, a corporate intranet, a local area network, a mobile communication network, and combinations thereof.

The electronic device for image processing method may further include an input apparatus 1003 and an output apparatus 1004. The processor 1001, the memory 1002, the input apparatus 1003 and the output apparatus 1004 may be connected by a bus or other means. FIG. 10 takes the connection by a bus as an example.

The input apparatus 1003 may receive an input digital or character information and generate a key signal input related to a user setting and function control of the electronic device for image processing, for example, an input apparatus, such as a touch screen, a keyboard, a mouse, a trackpad, a touchpad, an indicator bar, one or more mouse buttons, trackballs, joysticks, and the like. The output apparatus 1004 may include a display device, an auxiliary lighting apparatus (e.g., an LED), a tactile feedback device (e.g., a vibration motor), and the like. The display device may include, but is not limited to, a liquid crystal display (LCD), a light emitting diode (LED) display, and a plasma display. The display device may be a touch screen in some embodiments.

Various implementations of the systems and technologies described herein may be implemented in a digital electronic circuit system, an integrated circuit system, an application-specific integrated circuits (ASIC), a computer hardware, a firmware, a software, and/or combinations thereof These various implementations may implement in one or more computer programs, the one or more computer programs may be executed and/or interpreted on a programmable system including at least one programmable processor, the programmable processor may be a dedicated or general programmable processor, which may receive data and instruction from a storage system, at least one input apparatus, and at least one output apparatus, and transmit the data and instruction to the storage system, the at least one input apparatus, and the at least one output apparatus.

These computer programs (also referred as programs, software, software applications, or codes) include machine instructions for programmable processors, and may utilize high-level procedures and/or object-oriented programming languages, and/or assembly/machine language to implement these computer programs. As used herein, the terms "machine-readable medium" and "computer-readable medium" refer to any computer program product, device, and/or apparatus (for example, a magnetic disk, an optical disk, a memory, a programmable logic device (PLD)) used to provide machine instructions and/or data to a programmable processor, including machine-readable media that receive a machine instruction as a machine-readable signal. The term "machine-readable signal" refers to any signal used to provide machine instructions and/or data to a programmable processor.

In order to provide an interaction with a user, the system and technology described here may be implemented on a computer, the computer includes: a display device for displaying information to the user (for example, cathode ray tube (CRT) or liquid crystal display (LCD) monitor); and a keyboard and pointing apparatus (for example, a mouse or a trackball), the user may provide input to the computer by the keyboard and the pointing apparatus. Other types of apparatuses may also be used to provide interaction with the user; for example, a feedback provided to the user may be any form of sensory feedback (for example, visual feedback, auditory feedback, or tactile feedback); and may receive input from the user in any form (including acoustic input, voice input, or tactile input).

The system and technology described here may be implemented in a computing system that includes a back-end component (for example, as a data server), or a computing system that includes an intermediate component (for example, an application server), or a computing system that includes a front-end component (for example, a user computer with a graphical user interface or a web browser, through which the user may interact with the implementation of the system and technology described herein), or a computing system that includes any combination of such back-end component, intermediate component, or front-end component. The components of the system may be connected to each other through a digital data communication (for example, a communication network) in any form or medium. Examples of the communication network include local area network (LAN), wide area network (WAN), and the Internet.

A computer system may include a client and a server. The client and server are generally far away from each other and usually interact through a communication network. A relationship between the client and the server is generated through a computer program running on a corresponding computer and having a client-server relationship with each other.

According to the technical solutions of the embodiments of the present application, a first PSNR between a first original image and a first decoded image corresponding to the first original image and a second PSNR between a noise-added image and a second decoded image corresponding to the noise-added image are obtained by the embodiments of the present application, and a credible reason for a PSNR between an image and a corresponding decoded image being low can be obtained according to the two objective experimental data of the first PSNR and the second PSNR. That is, the method according to the embodiments of the present application may obtain the credible reason for the PSNR between the image and the corresponding decoded image being low, thereby ensuring a normal operation of an automatic driving.

It should be understood that the various forms of processes shown above may be used to reorder, add or delete steps. For example, the steps disclosed in the present application may be executed in parallel, sequentially, or in a different order, as long as the desired results of the technical solutions disclosed in the present application can be achieved, there is no limitation here.

The above specific implementations do not constitute a limitation to the protection scope of the present application.

Those skilled in the art should understand that various modifications, combinations, sub-combinations, and substitutions may be made according to design requirements and other factors. Any modifications, equivalent substitutions and improvements made within the spirit and principles of the present application shall be included in the protection scope of the present application.

What is claimed is:

1. An image processing method, applied to a vehicle-mounted terminal on a vehicle with an automatic driving system being run, the method comprises:
   obtaining an original image and a noise-added image, wherein the noise-added image is an image of the original image after a noise is added, and a number of pixels with a noise in the original image is less than a preset number;
   encoding and decoding the original image and the noise-added image respectively, to obtain a first decoded image corresponding to the original image and a second decoded image corresponding to the noise-added image;
   obtaining a first peak signal to noise ratio (PSNR) between the first decoded image and the original image according to the original image and the first decoded image;
   obtaining a second PSNR between the second decoded image and the noise-added image according to the noise-added image and the second decoded image, wherein the first PSNR is greater than a preset threshold, and the first PSNR is greater than the second PSNR;
   displaying the first PSNR and the second PSNR;
   obtaining a reason for the second PSNR being low according to the first PSNR and the second PSNR; and
   outputting an indication information, wherein the indication information is used to indicate the reason for the second PSNR being low.

2. The method according to claim 1, wherein the obtaining an original image and a noise-added image, comprises:
   receiving the original image and the noise-added image.

3. The method according to claim 1, wherein the obtaining an original image and a noise-added image, comprises:
   receiving the original image;
   performing noise addition processing on the original image to generate the noise-added image.

4. The method according to claim 3, wherein the performing noise addition processing on the original image to generate the noise-added image, comprises:
   randomly selecting at least one pixel of the original image to add a salt noise or a pepper noise to obtain the noise-added image.

5. The method according to claim 3, wherein the performing noise addition processing on the original image to generate the noise-added image, comprises:
   randomly selecting at least one first pixel of the original image to add a salt noise, and randomly selecting at least one second pixel of the original image to add a pepper noise to obtain the noise-added image.

6. The method according to claim 3, wherein the performing noise addition processing on the original image to generate the noise-added image, comprises:
   adding a Gaussian noise to each pixel of the original image to obtain the noise-added image.

7. The method according to claim 1, wherein the original image is a frame image in a video collected by a camera of the vehicle when the vehicle drives automatically.

8. The method according to claim 1, wherein a format of the original image is a Luma and Chroma (YUV) format.

9. An electronic device, applied to a vehicle-mounted terminal on a vehicle with an automatic driving system being run, the electronic device comprises:
   at least one processor; and
   a memory, communicatively connection with the at least one processor; wherein, the memory stores an instruction that is executable by the at least one processor, and the at least one processor is configured to:
   obtain an original image and a noise-added image, wherein the noise-added image is an image of the original image after a noise is added, and a number of pixels with a noise in the original image is less than a preset number;
   encode and decode the original image and the noise-added image respectively, to obtain a first decoded image corresponding to the original image and a second decoded image corresponding to the noise-added image;
   obtain a first peak signal to noise ratio (PSNR) between the first decoded image and the original image according to the original image and the first decoded image; and obtain a second PSNR between the second decoded image and the noise-added image according to the noise-added image and the second decoded image, wherein the first PSNR is greater than a preset threshold, and the first PSNR is greater than the second PSNR;
   display the first PSNR and the second PSNR;
   obtain a reason for the second PSNR being low according to the first PSNR and the second PSNR; and
   output an indication information, wherein the indication information is used to indicate the reason for the second PSNR being low.

10. The electronic device according to claim 9, wherein the at least one processor is specifically configured to:
    receive the original image and the noise-added image.

11. The electronic device according to claim 9, wherein the at least one processor is specifically configured to:
    receive the original image; and
    perform noise addition processing on the original image to generate the noise-added image.

12. The electronic device according to claim 11, wherein the at least one processor is specifically configured to:
    randomly select at least one pixel of the original image to add a salt noise or a pepper noise to obtain the noise-added image.

13. The electronic device according to claim 11, wherein the at least one processor is specifically configured to:
    randomly select at least one first pixel of the original image to add a salt noise, and randomly select at least one second pixel of the original image to add a pepper noise to obtain the noise-added image.

14. The electronic device according to claim 11, wherein the at least one processor is specifically configured to:
    add a Gaussian noise to each pixel of the original image to obtain the noise-added image.

15. The electronic device according to claim 9, wherein the original image is a frame image in a video collected by a camera of the vehicle when the vehicle drives automatically.

16. The electronic device according to claim 9, wherein a format of the original image is a Luma and Chroma (YUV) format.

17. A non-transitory computer-readable storage medium storing a computer instruction, wherein the computer instruction is used to cause a computer to execute the method according to claim 1.

* * * * *